F. A. DAUBINÉ.
PROCESS AND APPARATUS FOR DRYING AIR.
APPLICATION FILED JULY 5, 1910.

1,092,434.

Patented Apr. 7, 1914.
3 SHEETS—SHEET 1.

WITNESSES:
René Bruine
William F. Martinez

INVENTOR:
Félix Adolphe Daubiné.
By Attorneys,
Fraser Fink & Myers

F. A. DAUBINÉ.
PROCESS AND APPARATUS FOR DRYING AIR.
APPLICATION FILED JULY 5, 1910.

1,092,434.

Patented Apr. 7, 1914.
3 SHEETS—SHEET 2.

WITNESSES:
Rene Bruine
William F. Martinez

INVENTOR:
Félix Adolphe Daubiné,
By Attorneys,

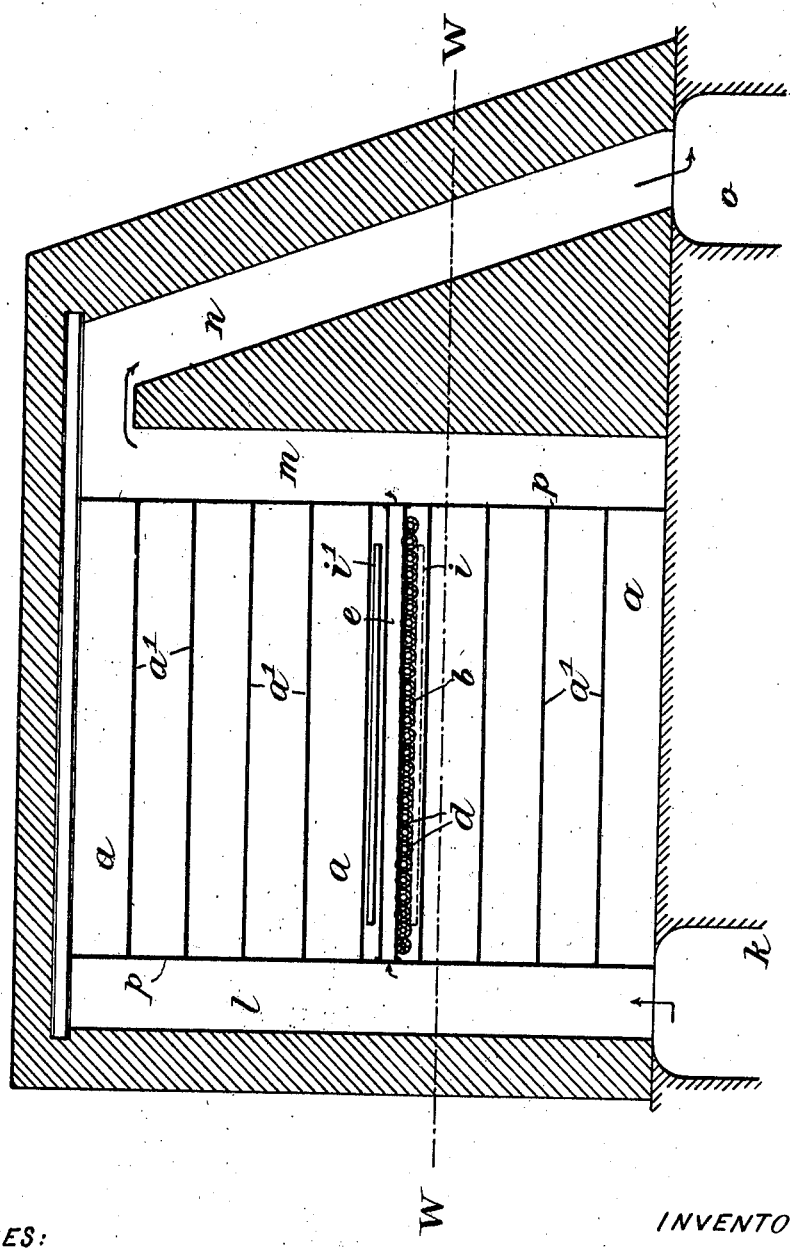

UNITED STATES PATENT OFFICE.

FÉLIX ADOLPHE DAUBINÉ, OF AUBOUÉ, FRANCE.

PROCESS AND APPARATUS FOR DRYING AIR.

1,092,434.  Specification of Letters Patent.  Patented Apr. 7, 1914.

Application filed July 5, 1910. Serial No. 570,526.

*To all whom it may concern:*

Be it known that I, FÉLIX ADOLPHE DAUBINÉ, a citizen of the Republic of France, residing in Auboué, Meurthe et Moselle, France, have invented certain new and useful Improvements in Processes and Apparatus for Drying Air, of which the following is a specification.

This invention relates to a process of drying air used for blast furnaces and other applications, by means of calcium chlorid. In this process the calcium chlorid remains solid, at rest and without any incasing material; it is used in excess and undergoes a cycle of changes comprising the three following stages:—1. A stage in which moist air passes over it at a substantially constant temperature. 2. A stage in which it is regenerated by flue gases or other source of heat. 3. A stage in which it is cooled. All these operations are carried out in an apparatus which comprises no mechanism and requires no manipulation of the calcium chlorid at any point of the cycle.

In this process the calcium chlorid owing to the fact that it is present in large excess, becomes hydrated only superficially without liquefying and is regenerated, without being removed, at a temperature below 235° C., above which calcium chlorid loses its activity; it is then cooled by a system of pipes through which water is circulating, or by mere prolonged rest, whereupon, it is ready to be hydrated again.

The apparatus for this process varies in dimensions and form according to the situation where the drying is required or to the quantity of air to be dried or of the flue gases available.

Figure 1:
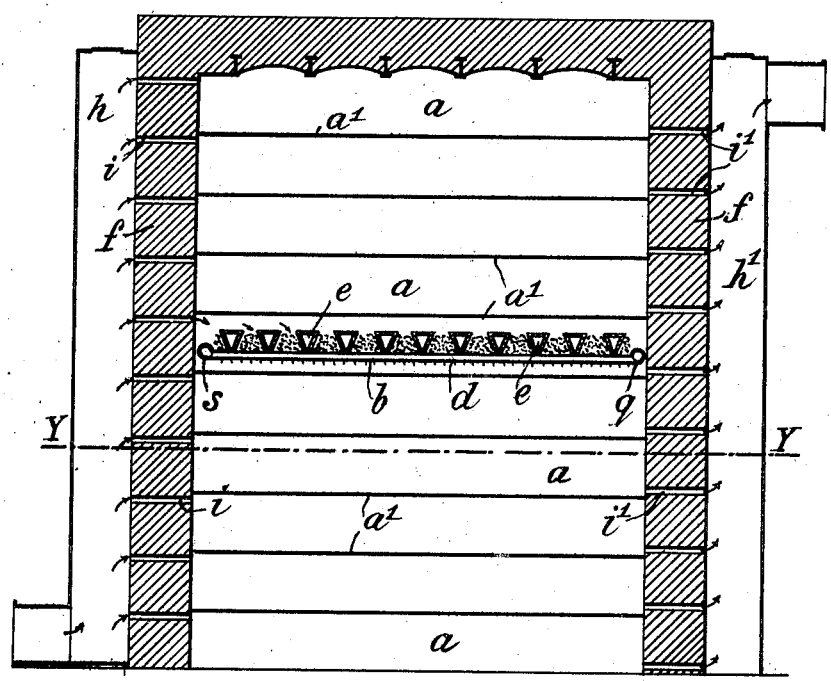
Figure 2:
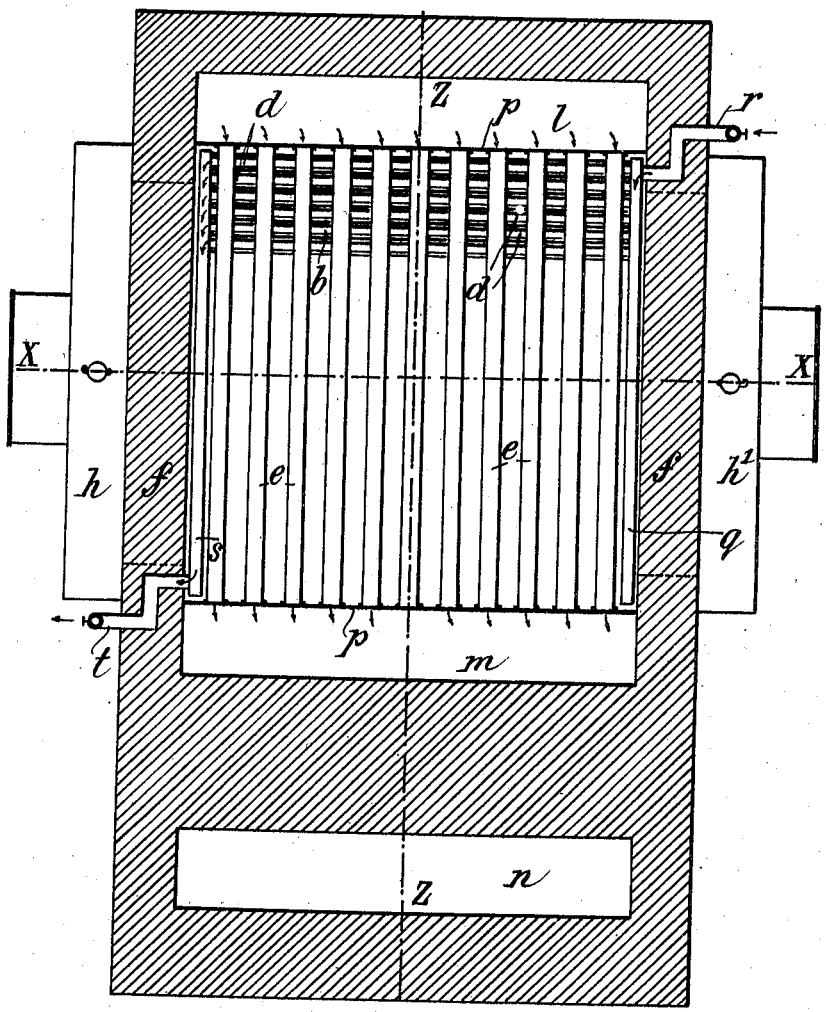

An example of apparatus suitable for the process is shown in the accompanying drawings Figure 1 being a vertical transverse section on line X—X of Fig. 2, which is a horizontal section on line Y—Y of Fig. 1 or W W Fig. 3; Fig. 3 is a vertical longitudinal section on line Z—Z of Fig. 2.

The apparatus consists of a chamber of suitable dimensions, subdivided by horizontal partitions $a'$ into 10 superimposed compartments $a$, for example; each compartment contains a grating which may be formed of pipes $d$ for circulating water. The layer of calcium chlorid on the grating is traversed by pipes $e$ for circulation of hot gases, arranged at right angles to the water pipes $d$. The pipes constituting the grating are fed in parallel from a main pipe $q$ supplied with water from a pipe $r$, and deliver into a main pipe $s$ whence the water flows by a pipe $t$. The compartments are all alike and the bottom of the chamber is hermetically sealed.

The air to be dried enters the compartments through openings $i$ in the wall $f$ from a box $h$ (Figs. 1 and 2) on one side of the apparatus. The openings $i$ being above the layer of calcium chlorid in the compartment, the air passes through the layer in order to leave the compartment by the opening $i'$ below the layer.

The hot waste gases enter the chamber from a flue $k$ (Fig. 3) opening into a channel $l$ where they are distributed through the pipes $e$; from the latter they issue into the channel $m$ to escape by channel $n$ and flue $o$. The pipes $e$ may be set in headers $p$, like boiler tubes; pipes of triangular section are shown but they may be of any suitable cross section.

The apparatus operates as follows:—In the first stage of the cycle (Fig. 1) the air enters the box $h$ and is delivered through openings $i$ on to the layers of dry calcium chlorid on the gratings. It passes through the chlorid at a speed progressively decreasing by reason of the increasing cross section of the passages through the grate and issues dried through openings $i'$ into the collecting box $h'$ after having hydrated the surface of the small pieces of calcium chlorid. During this first stage, the flue gases are not passing through pipes $e$, but if necessary water may be circulated through the pipes of the gratings. In the second stage of the cycle, the air is stopped and the hot flue gases are passed through the pipes $e$, giving up their heat to the calcium chlorid on the gratings, which is thereby regenerated. A thermometer is provided, inspection of which permits regulation of the temperature of the chlorid which should not exceed 235° C. In the third stage of the cycle, the dried but hot chlorid is cooled. For this purpose the flue gases are cut off from the pipes $e$, and the apparatus is allowed to cool, or if a mere rapid cooling is required cold water is circulated through the pipes $d$. The apparatus is then again ready for the first stage of the cycle.

An installation of this kind may be situated on the intake side of the blowers or on the delivery side; it will generally comprise three chambers such as has been described, in which the moist air will circulate in succession. At any given moment, one of the chambers will be drying the blast, another will be in the stage of being regenerated by flue gases and the third in the stage of cooling. At the proper time the function of each chamber is changed to the next stage.

It is advisable to provide a fourth chamber as a reserve.

Having now particularly described and ascertained the nature of my said invention and in what manner the same is to be performed what I claim is:—

1. A process of drying air by means of calcium chlorid for blast furnaces or other applications, consisting first, in passing the moist air through a layer of calcium chlorid used in excess, at a substantially constant temperature, the calcium chlorid remaining solid and at rest without being incased, second, regenerating the calcium chlorid by flue gases or other source of heat not exceeding 235° C. in temperature and third, recooling the dried calcium chlorid before repeating the first step, substantially as described.

2. An apparatus for drying air, comprising a chamber of suitable dimensions partitioned into superimposed compartments wherein are gratings for supporting calcium chlorid consisting of pipes through which cooling water may circulate, pipes for passage of flue gases crossing said grating, channels on two sides of the chamber through which flue gases pass to and from said gas pipes, and boxes on the other two sides through which air to be dried and the dried air pass into and out of the chamber respectively, these boxes communicating with the interior of the chamber through openings in the walls thereof, substantially as described.

3. In an apparatus for drying air, the combination of a compartment containing calcium chlorid, an air passage through said compartment, means for cooling said calcium chlorid, said means comprising a series of pipes through which a cooling medium is adapted to circulate, and means for heating said calcium chlorid, said means comprising a series of pipes through which a heating medium is adapted to pass, one of said series of pipes constituting a grating for the support of the calcium chlorid.

4. In an apparatus for drying air, the combination of a compartment containing calcium chlorid, an inlet to said compartment in the upper part thereof and above said support for the calcium chlorid, and an outlet from said compartment in the lower part thereof and below said support for the calcium chlorid, means for cooling said calcium chlorid, said means comprising a series of pipes through which a cooling medium is adapted to circulate, and means for heating said calcium chlorid, said means comprising a series of pipes through which a heating medium is adapted to pass, one of said series of pipes constituting a grating for the support of the calcium chlorid.

5. In an apparatus for drying air, the combination of a plurality of compartments containing calcium chlorid, means for heating said calcium chlorid, means for cooling the same and means for passing air through successive compartments while the calcium chlorid is being heated in a portion of said compartments and cooled in other compartments.

6. In a process for drying air, passing air through calcium chlorid in a solid state spread upon a grate, maintaining the calcium chlorid at a temperature of approximately 15° C. during the drying of the air, heating the calcium chlorid progressively and not exceeding a temperature of 235° C., and subsequently cooling the calcium chlorid.

7. In a process for drying air, passing air in contact with calcium chlorid for the purpose of extracting moisture therefrom, and maintaining the calcium chlorid at a temperature of approximately 15° C. during the drying of the air, and subsequently heating the calcium chlorid to a temperature not exceeding 235° C.

In witness whereof, I have hereunto signed my name in the presence of two subscribing witnesses.

FÉLIX ADOLPHE DAUBINÉ.

Witnesses:
P. FISCHBACK,
H. BARDEL.